(12) United States Patent
Riza

(10) Patent No.: US 10,721,411 B2
(45) Date of Patent: Jul. 21, 2020

(54) SMART PHOTONIC IMAGING METHOD AND APPARATUS

(71) Applicant: UNIVERSITY COLLEGE CORK-NATIONAL UNIVERSITY OF IRELAND, CORK, Cork (IE)

(72) Inventor: Nabeel Agha Riza, Cork (IE)

(73) Assignee: University College Cork—National University of Ireland, Cork, Cork (IE)

(*) Notice: Subject to any disclaimer, the term of this patent is extended or adjusted under 35 U.S.C. 154(b) by 356 days.

(21) Appl. No.: 15/520,824

(22) PCT Filed: Oct. 21, 2015

(86) PCT No.: PCT/EP2015/074419
§ 371 (c)(1),
(2) Date: Apr. 20, 2017

(87) PCT Pub. No.: WO2016/062785
PCT Pub. Date: Apr. 28, 2016

(65) Prior Publication Data
US 2019/0109973 A1 Apr. 11, 2019

(30) Foreign Application Priority Data

Oct. 21, 2014 (GB) .................................. 1418678.7
Dec. 18, 2014 (GB) .................................. 1422684.9

(51) Int. Cl.
*H04N 5/235* (2006.01)
*G03B 17/17* (2006.01)
(Continued)

(52) U.S. Cl.
CPC ........... *H04N 5/2355* (2013.01); *G03B 17/17* (2013.01); *H04N 5/2254* (2013.01); *H04N 5/2258* (2013.01); *H04N 5/238* (2013.01)

(58) Field of Classification Search
CPC .... H04N 5/2355; H04N 5/2254; H04N 5/238; H04N 5/2258; G03B 17/17
See application file for complete search history.

(56) References Cited

U.S. PATENT DOCUMENTS 6,975,355 B1    12/2005   Yang et al.
8,783,874 B1    7/2014    Riza
(Continued)

OTHER PUBLICATIONS

Nag et al., "Two-photon cross-section measurements using an optical chopper: z-scan and two-photon fluorescence schemes," *J. Phys. B: At. Mol. Opt. Phys.*, vol. 42, No. 6, p. 065103, 2009.
(Continued)

*Primary Examiner* — Quan Pham
(74) *Attorney, Agent, or Firm* — Knobbe Martens Olson & Bear LLP

(57) ABSTRACT

The present invention provides a method for performing high dynamic range optical image detection of a scene comprising: imaging incident light from a scene onto an object plane; determining the locations of those pixels in the object plane of higher brightness; detecting the optical irradiance values of those pixels of higher brightness to produce a first detected image; detecting the optical irradiance values of those pixels of lower brightness to produce a second detected image; and generating a high dynamic range optical irradiance map of the scene by combining the first detected image and the second detected image into a single image.

15 Claims, 10 Drawing Sheets

(51) Int. Cl.
*H04N 5/225* (2006.01)
*H04N 5/238* (2006.01)

(56) References Cited

U.S. PATENT DOCUMENTS

| | | |
|---|---|---|
| 2003/0174234 A1 | 9/2003 | Kondo et al. |
| 2011/0074983 A1 | 3/2011 | Bush |
| 2011/0211077 A1 | 9/2011 | Nayar et al. |
| 2012/0249744 A1 | 10/2012 | Pesach et al. |
| 2013/0100333 A1* | 4/2013 | Awatsuji .............. G03H 1/0443 348/335 |
| 2014/0132946 A1* | 5/2014 | Sebastian .............. G01J 3/0294 356/51 |

OTHER PUBLICATIONS

International Search Report and Written Opinion dated Jun. 7, 2016 in International Application No. PCT/EP2015/074419, filed Oct. 21, 2015.

International Preliminary Report on Patentability dated Apr. 25, 2017 in International Application No. PCT/EP2015/074419, filed Oct. 21, 2015.

\* cited by examiner

SMART PHOTONIC IMAGING METHOD AND APPARATUS

FIELD

The field of invention is optical imaging, and the concept applies to one-dimensional (1-D), 2-D and Three Dimensional (3-D) imaging including super-resolution (beyond Abbe diffraction limit) imaging.

BACKGROUND

Optical imaging camera technology is currently dominated by 2-D Photo-Detector Array (PDA) sensor chips based optical imagers. These include Charge Coupled Device (CCD), and CMOS technology multi-pixel optical sensor chips and Focal Plane Arrays (FPAs). Such imaging units form excellent imagers under standard light conditions, particularly for visible band imaging applications, where silicon sensors produce excellent image quality. For bright light imaging applications, optical attenuators can be placed before the camera sensor unit. However, such an approach can alter and sometimes deteriorate the original image quality. In particular, it has been found that coherent laser radiation easily saturates CCD/CMOS image sensors, making them highly non-attractive for accurate laser beam irradiance mapping. Furthermore, bright zones within a normal lighting level scene can distort the scene captured by a CCD/CMOS chip camera, and consequently the scene can often be rendered unobservable.

To enable robust optical irradiance mapping, such as under high brightness conditions, a Digital Micromirror Device (DMD) can be used an agile pixel optical irradiance sampler. The DMD can direct sampled light in the optical irradiance 2-D map to a single point detector (PD) or a pair of single PDs. Such an imager design allows software programming of the size, shape, location, and temporal duration of the agile pixel that pixel-by-pixel sample the optical irradiance map present on the DMD plane. Thus, the function of a multi-pixel PDA chip with for example a million photo-detector pixels working in parallel is replaced by a multi-pixel shutter or mirror array device with a million micro-mirrors, and used in conjunction with a single point PD pair with the DMD operating in serial mode, one pixel at a time. Hence, inter-pixel crosstalk within a CCD/CMOS type device is essentially eliminated. This includes the elimination of pixel saturation and flooding due to high light levels at a given pixel.

It will be appreciated that the speed of image capture using a DMD depends on how fast the agile pixel can be scanned on the DMD plane to generate the adequate optical irradiance samples to electronically stitch together the collected image point sample data. Hence, the smaller the agile pixel, and the greater the number of samples, the longer it takes to generate an optical irradiance map. This is assuming that the reset time of the micromirrors on the DMD creates the time constraint versus the response time of the point PD and the data acquisition and image processing electronics. As a DMD is a broadband device (400 nm-2500 nm), a DMD imager also forms a versatile broadband imager, particularly for bright light conditions where attenuation of incident irradiance is to be avoided.

It is known to provide an active 3-D imager based on a laser beam with an Electronically Controlled Variable Focal length Lens (ECVFL) and a CCD/CMOS imager. It is also known to incorporate a dual PD DMD-based imager within such an active 3-D imager design using a CCD, laser, and ECVFL. In this imaging system, when the laser is on, the full DMD is set to its $+\theta$ state, so that on reflection from a target, light returns the same way to the CCD so the laser spot can be observed on the target. When the laser is turned off, the DMD can operate with both $+\theta$ state and $-\theta$ state at the same time, to enable the system to act as a point sampler to generate an image using the two point PDs under non-active illumination light conditions. In other words, this system acts either as an active imager using the laser and CCD with the DMD in one mirror state or as a passive imager using both the states of operation of the DMD along with the dual point PDs with the laser turned off.

Another known DMD-based imager places a single PD and a single PDA in each arm of two deflected light beam ports of a DMD, in order to realize a compressive imager where the PDA is a medium or small pixel count PDA (compared to the DMD), and is needed to view only a sub-set of the scene pixels in a larger pixel count scene normally viewed by one large pixel count PDA. This configuration can also be used with the two PDAs operating at different wavelengths compared to the point PDs, thus enabling a three wavelength band imager to be provided. In this configuration, the wavelength $\lambda 2$ band image viewing uses the DMD operating in both its states with the two point PDs to implement serial sequence agile pixel scans across the DMD plane, the wavelength $\lambda 1$ band image viewing uses the DMD operating in its $+\theta$ state with the $\lambda 1$ PDA, with the option of individually time modulated the DMD pixels to its $-\theta$ state to reduce the PDA pixel exposure time to improve scene dynamic range. The wavelength $\lambda 3$ band image viewing uses the DMD operating in its $-\theta$ state with the $\lambda 3$ PDA, with the option again of the pixels being individually time modulated to its $+\theta$ state to reduce the PDA pixel exposure time to improve scene dynamic range. Thus, this configuration uses the DMD pixel control to select the desired wavelength band photo-detectors to be used for image acquisition. It should be noted that this system focuses on the usage of a small pixel count PDA, such as a FPA device, which are used for non-visible band applications. The mirror motion optics select the smaller pixel count scene from the full image on the DMD to transfer onto the smaller pixel count PDA chips. Hence, this system implements a compressive sampling of the input image scene present on the DMD.

It would be desirable that the entire large pixel count image could be detected with high dynamic range by the camera and inter-pixel crosstalk, pixel spill over due to saturation and flooding could be avoided or minimized to capture as much as possible of the true imaged scene when dealing with extreme imaging conditions involving bright lights within viewed scenes. In addition, it is desirable that the imager not only provides a high signal-to-noise ratio image but also provide a spatial imaging resolution that beats the classic Abbe diffraction limit to enable super-resolution imaging.

The present invention is concerned with overcoming at least some of the above mentioned problems with known imaging systems.

SUMMARY OF THE INVENTION

The present invention, as set out in the appended claims, provides a method for performing high dynamic range optical image detection of a scene comprising:
imaging incident light from a scene onto an object plane;
determining the locations of those pixels in the object plane of higher brightness;

detecting the optical irradiance values of those pixels of higher brightness to produce a first detected image; detecting the optical irradiance values of those pixels of lower brightness to produce a second detected image; and generating a high dynamic range optical irradiance map of the scene by combining the first detected image and the second detected image into a single image.

By physically separating brighter pixels in a scene from less bright pixels, and capturing the brighter pixels in one image and the less bright pixels in another image, followed by combining the two captured images together, it enables accurate measurement of the captured scene. This is particularly beneficial under bright light scene conditions, which would typically distort or render a scene unobservable when captured by a conventional imaging system.

In one embodiment, the object plane corresponds to the object plane of a 2D Spatial Light Modulator Device, SLM.

The SLM may comprise a Digital Micromirror Device, DMD, and wherein the method further comprises: setting the DMD micromirrors to its $-\theta$ degree tilt state to direct sampled light from the object plane for detection of the optical irradiance values of those pixels of higher brightness; and setting the DMD micromirrors to its $+\theta$ degree tilt state to direct sampled light from the object plane for detection of the optical irradiance values of those pixels of lower brightness.

The method may further comprise determining the locations of those pixels in the object plane of higher brightness by setting the DMD micromirrors to its $-\theta$ degree tilt state and detecting those pixels in the object plane of higher brightness.

The method may further comprise detecting by a Scheimpflug principle-based point photo detector, PD, the optical irradiance values of those pixels of higher brightness and detecting by a Scheimpflug principle-based 2-D photo detector array, PDA, the optical irradiance values of those pixels of lower brightness.

The point photo-detector may comprise a light guiding optical device and a point-photo-detector.

In one embodiment, the DMD, light guiding optical device and the point-photo-detector are stacked together to form a secure optical data link.

The method may further comprise detecting the optical irradiance values of those pixels of higher brightness by the PD one at a time.

The method may further comprise amplifying the optical irradiance values detected by the point photo detector.

The method may further comprise blocking light from reaching the photo detector array while detecting the optical irradiance values of those pixels of higher brightness by the point photo detector.

The method may further comprise amplifying the light from the object plane prior to the detection of the optical irradiance values of those pixels of higher and lower brightness.

The step of imaging the incident light from a scene onto the object plane may further comprise imaging different on-axis focal planes in the image scene to provide 3-D imaging.

The object plane may correspond to the object plane of a 2D Digital Micromirror Device, DMD, and wherein the method further comprises operating the DMD in its confocal pin-hole mode for 3-D imaging.

The method may further comprise programming the DMD with a pinhole in either the micromirror $-\theta$ degree tilt state or the micromirror $+\theta$ degree tilt state to acquire the 3-D image data.

The method may further comprise detecting by a first Scheimpflug principle-based 2-D photo detector array the optical irradiance values of those pixels of higher brightness and detecting by a second Scheimpflug principle-based 2-D photo detector array, PDA, the optical irradiance values of those pixels of lower brightness.

The method may further comprise detecting the optical irradiance values of those pixels of higher brightness and those pixels of lower brightness simultaneously.

The method may further comprise focussing the light prior to the detection of the optical irradiance values of those pixels of higher brightness and those pixels of lower brightness.

The focussing may further comprise performing a magnification or a demagnification of the scene.

The method may further comprise attenuating the light from the object plane prior to the detection of the optical irradiance values of those pixels of higher brightness.

The method may further comprise filtering the colour of the light prior to detecting the optical irradiance values.

The irradiance map may be generated via a DC electrical signal representing the light generated electrical charge.

In one embodiment the method may further comprise imaging incident light from a scene onto two object planes simultaneously using a variable beam splitter device.

The variable beam splitter may direct light in a first direction from the two object planes for detection of the optical irradiance at higher brightness and directs light in a second direction from the two object planes for detection of the optical irradiance at lower brightness.

The method may further comprise detecting by two point photo detectors the optical irradiance values of those pixels of higher brightness and detecting by a 2-D photo detector array the optical irradiance values of those pixels of lower brightness.

The method may further comprise detecting the optical irradiance values of those pixels of higher brightness and those pixels of lower brightness simultaneously.

The method may further comprise separating the vertical and horizontal linear components of the light polarizations prior to detecting the optical irradiance values.

The method may further comprise providing a pair of PDs to detect each orthogonal linear polarization separately.

The method may further comprise operating the SLM in time modulation mode.

The SLM may comprise a multi-pixel optical display device, and wherein the method further comprises time modulating the incident light irradiance of one or more of the pixels on the object plane at a specific temporal frequency.

The method may further comprise independently controlling the time modulation of the incident light irradiance for each of the one or more pixels, and wherein each pixel is time modulated at a different selected frequency.

The steps of detecting the optical irradiance values may further comprise the steps of: Intermediate Frequency, IF, band amplifying and filtering each detected time modulating signal; and performing an IF band spectrum analysis of the filtered signal so as to detect the relative optical irradiance values for the time modulated pixel locations in the object plane so as to reconstruct the optical image at the object plane.

The IF band amplifying may comprise standalone amplification.

The IF band amplifying may comprise coherent lock-in amplification and/or standalone amplification.

The step of performing an IF band spectrum analysis may comprise performing a Fast Fourier Transform.

The method may further comprise detecting the relative optical irradiance values by photo detectors having a bandwidth exceeding the highest temporal modulation frequency of the SLM pixel.

The method may further comprise selecting the temporal frequencies of the SLM pixels to reduce non-linear processing effects.

The method may further comprise adapting the size of the active area of the point photo-detector to spatially integrate light over many fringe cycles of an interference pattern.

The method may further comprise providing a random optical phase to the optical fields at the different time modulating pixel locations.

The size of each time modulating pixel on the SLM object plane may be smaller than the transverse dimension Abbe diffraction limit of the optical system.

The step of imaging incident light from a scene may comprise imaging incident light from an object located directly on the SLM chip cover glass or adjacent to the multi-pixel optical display device.

The object may comprise a plurality of stacked thin fluidic surface layers placed atop the SLM chip, wherein only one fluidic layer channel is adapted to contain the sample to be imaged at any time, with the other fluidic layers adapted to be filled with a refractive index matching fluid.

The steps of detecting the optical irradiance values may further comprise using a defocus algorithm when sample layers are not directly in the close near field of the SLM pixel planes.

The object may be 3-D, and the method may further comprise using a confocal microscopy technique to select the axial plane of the object for imaging.

The method may further comprise determining the location of the time modulating pixels on the display, the size of the pixels, the shape of the pixels, the temporal frequencies of modulation, the modulation type and the number of pixels which are simultaneously time modulated based on the field of application of the optical image detection.

The SLM may be a transmissive SLM.

The SLM may be a reflective SLM.

The method may further comprise optical wavelength coding each of the one or more SLM pixels on the object plane.

The method may further comprise wavelength coding each of the one or more SLM pixels on the object plane at different wavelengths.

The method may further comprise the step of separating the different wavelengths prior to detecting the optical irradiance values.

The SLM may comprise a multi-pixel optical spatial modulation device, and wherein the method may further comprise simultaneously time modulating the incident light irradiance of one or more of the pixels on the SLM using a binary code sequence to give each of the one or more pixels a spread spectrum in the electrical frequency domain.

The incident light irradiance of the one or more pixels on the SLM may be time modulated on an intermediate frequency carrier.

The SLM may comprise a 2-D light source array device and wherein the step of imaging light from a scene comprises imaging incident light from an object located adjacent to the light source array device, and wherein the light irradiance of the one or more pixels on the light source array device are time modulated using a binary code sequence.

The light irradiance of the one or more pixels on the light source array device may be time modulated on an intermediate frequency carrier.

The object may be located on a microscope slide on the light source array device.

The binary code sequence may comprise a Code Division Multiple Access, CDMA, binary sequence code.

The CDMA codes may be mutually orthogonal to one another.

The steps of detecting the optical irradiance values may further comprise the steps of:
amplifying and filtering the multi-pixel CDMA signal comprising the sum of the one or more time modulated pixels;
data sampling the filtered multi-pixel CDMA signal; and
performing CDMA signal processing on the data sampled signal.

The multi-pixel CDMA signal may comprise a baseband multi-pixel CDMA signal and wherein the data sampling is performed by an analog to digital converter.

The multi-pixel CDMA signal may comprise a multi-pixel CDMA signal on an intermediate frequency carrier and wherein the data sampling is performed by a RF mixer coupled to a local RF oscillator.

The step of performing CDMA signal processing on the data sampled signal may further comprise:
dividing the multi-pixel CDMA signal into one or more replicas corresponding to the one or more time modulated pixels; and
inputting each of the one or more replicas to a corresponding time integrating correlator provided with the CDMA code associated with that pixel, wherein the output of the correlator corresponds to the optical irradiance value of that pixel.

The binary code sequence for modulating the incident light irradiance of the one or more pixels and the binary code sequence provided to the one or more time integrating correlators may be generated using the same time-base.

The size of each time modulated pixel on the SLM or on the light source array device may be smaller than the transverse dimension Abbe diffraction limit of the optical system.

The step of determining the locations of those pixels in the object plane of higher brightness may comprise:
comparing the irradiance value of each pixel in the object plane to a predetermined threshold irradiance value; and
determining that a pixel is of higher brightness if its irradiance value is higher than the threshold irradiance value.

Those pixels of lower brightness may correspond to those pixels in the object plane which are determined to have an irradiance value equal to or lower than the predetermined threshold irradiance value.

The present invention also provides an apparatus for performing high dynamic range optical image detection of a scene comprising:
means for imaging incident light from a scene onto an object plane;
means for determining the locations of those pixels in the object plane of higher brightness;
means for detecting the optical irradiance values of those pixels of higher brightness to produce a first detected image;
means for detecting the optical irradiance values of those pixels of lower brightness to produce a second detected image; and
means for generating a high dynamic range optical irradiance map of the scene by combining the first detected image and the second detected image into a single image.

In another embodiment there is provided apparatus for performing high dynamic range optical image detection of a scene comprising:

a module for imaging incident light from a scene onto an object plane;
a module for determining the locations of those pixels in the object plane of a first brightness;
a module for detecting the optical irradiance values of those pixels of the first brightness to produce a first detected image;
a module for detecting the optical irradiance values of those pixels of a second brightness to produce a second detected image wherein the first brightness is higher than the second brightness; and
a module for generating a high dynamic range optical irradiance map of the scene by combining the first detected image and the second detected image into a single image.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
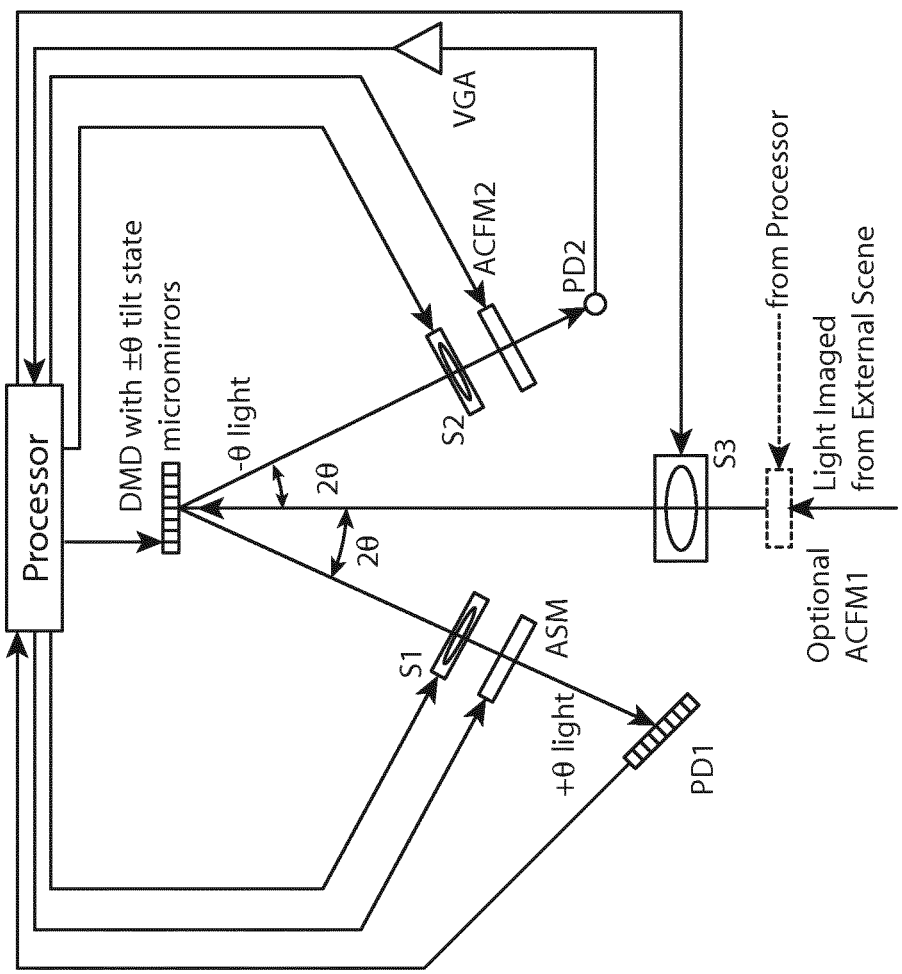
FIG. 1 discloses one embodiment of the imaging system of the present invention.

The present invention provides a smart camera unit designs that includes using the Scheinmpflug principle optical imaging layout and robust smart optical and electronic devices working in unison to deliver large pixel count (e.g., 1 million) scene imaging under extreme conditions of bright zones within scene. The designs of the invention are able to recover the true image of the scene and avoid or minimize inter-pixel crosstalk, pixel spill over due to saturation and flooding common in classic PDA cameras such as using CCD and CMOS sensor chips. Fundamentally, any type of 2-D Spatial Light Modulator (SLM) device can be used to implement the DMD chip function in the designs with appropriate modifications to optical layout based on the type of optical light modulation technology used in the SLM and whether the SLM is transmissive or reflective in design. The designs have the smartness to find pixels in a scene that are determined to be un-true or spoiling the true image so that high brightness pixels can be physically separated from the lower brightness pixels for independent unspoiled optical irradiance detection. Then with electronic image processing methods implemented in smart electronics, the two separated detected images can be stitched together to produce one true high pixel count image with high detection dynamic range. The DMD works in smart unison with the other active optics and electronics in the camera to form an adaptive system that can operate in a variety of parallel, serial, parallel-serial (hybrid) optical and electronic data acquisition and processing modes to deliver the true scene image. The DMD or advanced SLM device can also be programmed to act as a pixel-location dependent temporal frequency coded light irradiance super-spatial resolution modulator with the photo-detected signal undergoing electrical spectrum analysis to enable decoding of the incident irradiance level and its corresponding spatial position on the SLM with simultaneous detection of many spatial positions on the image. Exact mode of operation of the smart camera depends on the camera design and scene temporal and spatial irradiance conditions, including wavelengths of interest and scene 3-D motion effects. Applications for the proposed smart camera unit are diverse and suited for scenes with extreme light variation conditions such as at night time for sports events, aircraft landing zones, search and rescue operations, highways, etc. In addition, applications for the various embodiments of proposed smart camera unit designs including secure image data transfer and capture while defying the Abbe diffraction limit.

The present invention will now be described with reference to a number of different embodiments. Each of these embodiments provide a technique for performing high dynamic range optical image detection of a scene which involves the steps of imaging incident light from a scene onto an object plane, determining the locations of those pixels in the object plane of higher brightness, detecting the optical irradiance values of those pixels of higher brightness to produce a first detected image, detecting the optical irradiance values of those pixels of lower brightness to produce a second detected image; and generating a high dynamic range optical irradiance map of the scene by combining the first detected image and the second detected image into a single image.

FIG. 1 shows one embodiment of the smart photonic imager system design of the present invention. One camera output port uses a 2-D Photo-Detector Array (PDA) for lower brightness scene detection (PD1) and while the other output port uses a single Point Detector (PD) for higher brightness scene detection (PD2). S1, S2 and S3 are lens systems with variable focus controls. Using the S3 imaging lens system, light from an external scene is imaged onto the DMD plane. This light can pass through an optional electronically controlled ACFM: Attenuator and Color Filter module called ACFM1 so appropriate scene light attenuation and color selection can be implemented if required by the scene imaging application. The S1 system can include a set of imaging lenses, including ECVFLs for adaptive focus and image magnification/demagnification controls. The Digital Micromirror Device, DMD has a large number of tiny micromirrors (representing an image pixel site) and each micromirror can be set to either a $+\theta$ tilt state or a $-\theta$ degree tilt state to direct light incident on the pixel to either a $+\theta$ tilt state light propagation direction towards lens system S1 or a $-\theta$ degree tilt state light propagation direction towards lens system S2. Both S1 and S2 lens systems can be designed with a set of fixed focal length lenses plus ECVFLs. S1 functions to image the light from the DMD plane to the PD1 plane using the Scheimpflug principle shown in FIG. 2 with the appropriate optic devices placement angles with respect to the central axis ray. For optical image focus onto from the DMD plane to the PD1 plane, note that the planes of the DMD, S1, and PD1 are not parallel and must follow the angled placements shown in FIG. 2. PD1 is a 2D PDA such as a high pixel count CCD or CMOS sensor. Ideally, there should be a 1 to 1 match between the spatial locations of the DMD pixels and the PDA pixels. One could even have an integer multiple of PDA pixels representing 1 DMD pixel. Hence, the S1 lens system should be designed with the appropriate magnifications (if needed along both its orthogonal axes of pixel x-y layout) to match this DMD plane to PDA plane pixel-to-pixel matching requirement. By doing so, no original image pixel irradiance data is lost during the image transfer operation to the PDA PD1. The +θ tilt state imaged light also passes through an electronically controlled ASM: Attenuator and shutter module to both attenuate the overall imaged light but also to control the exposure time on the PD1 sensor. The shutter can also completely block the +θ tilt state light from entering the PD1 to prevent unwanted saturation effects. The shutter could also implement aperture control so as to spatially restrict certain +θ tilt state light from the image reaching PD1. All these electronically controlled smart optic devices work in unison with the control and image processor system to smartly operate the camera for best scene image capture. A fundamental aspect of the FIG. 1 design is the use of the DMD +θ tilt state light path for detection of the lower brightness pixels from the input scene image using the PD1 PDA sensor device/output port. In sharp contrast, the DMD −θ degree tilt state light path is used for detection of the higher brightness pixels from the input scene image using the PD2 PD device/output port. Here, the S2 lens system functions as a light collection or focusing lens that collects light from the scanning (or point sampling) micromirror on the DMD plane and brings it to focus so it can fall on the PD2 that is a single point detector with high dynamic range. The −θ degree tilt state light path passes through an electronically controlled ACFM2 to enable light attenuation and tunable wavelength filtering. The electrical signal generated from PD2 can be amplified by the electrical VGA: Variable Gain Amplifier. Note that both PD1 and PD2 can be replaced by an optical fiber bundle and single optical fiber, respectively. In these cases, the fiber bundle and single fiber are terminated with PD1 and PD2, respectively. Also note that before optical detection process at the PD1 and PD2 devices, camera output port +θ degree DMD tilt state light and −θ degree DMD tilt state light can be optically amplified by Optical Amplifier devices such as fiber-doped Optical Amplifiers or image intensifier devices.

The FIG. 1 camera design includes two imagers in one unit. The +θ degree DMD state light is processed in a Scheimpflug principle-based PDA PD1 camera where the scene pixels are measured in an optical parallel processing arrangement. On the other hand, the −θ degree DMD state light is processed within a single PD1 DMD-based imager that uses a serial pixel-by-pixel scan of the image on the DMD plane to record the individual pixel irradiance values that are used to assemble the image irradiance 2-D map via image processing. The mode of operation of the FIG. 1 camera depends on the scene and its application environment. Take the scenario of a scene containing some high brightness pixels within a lower brightness overall scene. In this case, the FIG. 1 camera can operate as follows. All DMD micromirrors are set to its +θ degree tilt state so all light from the DMD image plane is imaged onto the PDA PD1. The image signal produced by PD1 is processed in the image processor to determine the location of the higher brightness pixels. The threshold for determining whether a pixel is of high or low brightness can be set by the imager system operator, using either prior scene data or adaptive intelligence using scene sets under viewing. For example, in one embodiment, the threshold corresponds to the maximum dynamic range of PD1, as any pixel having a brightness which exceeds the dynamic range of PD1 will saturate the PD1, and thus the optical irradiance values of these pixels should be determined by PD2. In another embodiment, the threshold may be set to correspond to the value of the brightness of a pixel at a location on the object plane of particular interest to the operator.

Once these location are determined, micromirrors on the DMD at these image pixel locations are flipped to the −θ degree DMD tilt state. PD1 image is again processed by the image processor to make sure that the PD1 viewed image does not contain any high brightness pixels that would have otherwise saturated PD1 or distorted the image seen by PD1. If more pixels with image distortion are obtained, the DMD micromirrors at these pixel locations are also turned to the −θ degree DMD tilt state until PD1 sees a clear image of the partial scene that is free from optical distortions due to bright light zones in the scene. At this stage, all the pixel locations in the target scene and hence the DMD plane are known where the scene has high brightness. To measure the irradiance levels of these bright locations in the scene, the DMD tilt state is set to the −θ degree one at a time for these DMD/Image pixel locations so the PD2 can record individual light levels at these high brightness pixels one at a time. While this operation is being conducted, the shutter in the ASM can be used to block any light from reaching PD1 to prevent damage to PD1. The Variable optical attenuator in ACFM2 can be engaged if the light levels from the high brightness pixels in the image need further reduction before optical detection at PD2. After all high brightness pixels of the image have been captured by PD2, the image processor records this image data to create the high brightness zone of the original input scene image. Next using both the high brightness zone image (via PD2) and the lower bright scene zones via PD1, a full high dynamic range true image of the input scene is created by the image processor. This scene is without the distortion expected when using classic PDA cameras such as with CCD and CMOS sensors. In short, one camera output port uses a 2-D Photo-Detector Array (PDA) for lower brightness scene detection and while the other output port uses a single Point Detector (PD) for higher brightness scene detection, producing a novel imaging architecture and camera design. To enable 3-D imaging, the ECVFL in the S3 lens can change its focal length to image different on-axis focal planes in the image scene. If the target has many scattering focal planes like transmissive high scattering biological objects (e.g., tissue), a pin-hole can be placed before PD2 to improve out-of-focus light rejection. Note that the DMD when operating in its pin-hole pixel scan mode naturally operates as a spatial filtering confocal mode. In the FIG. 1 design, there are two detection ports at PD1 and PD2 to acquire the 3-D image confocal data, but the system operator must choose one PD at a time from which to acquire this 3-D data. For example, if PD1 is used to acquire the 3-D image data from the 3-D scene, then the DMD is programmed with a pinhole in the micromirror +θ degree tilt state so the sampled pinhole light is directed to PD1 while rejected light is sent towards the PD2 direction. In contrast, if PD2 is used to acquire the 3-D image data from the 3-D scene, then the DMD is programmed with a pinhole in the micromirror −θ degree tilt state so the sampled pinhole light is directed to PD2 while rejected light is sent towards the PD1 direction.

Figure 2:
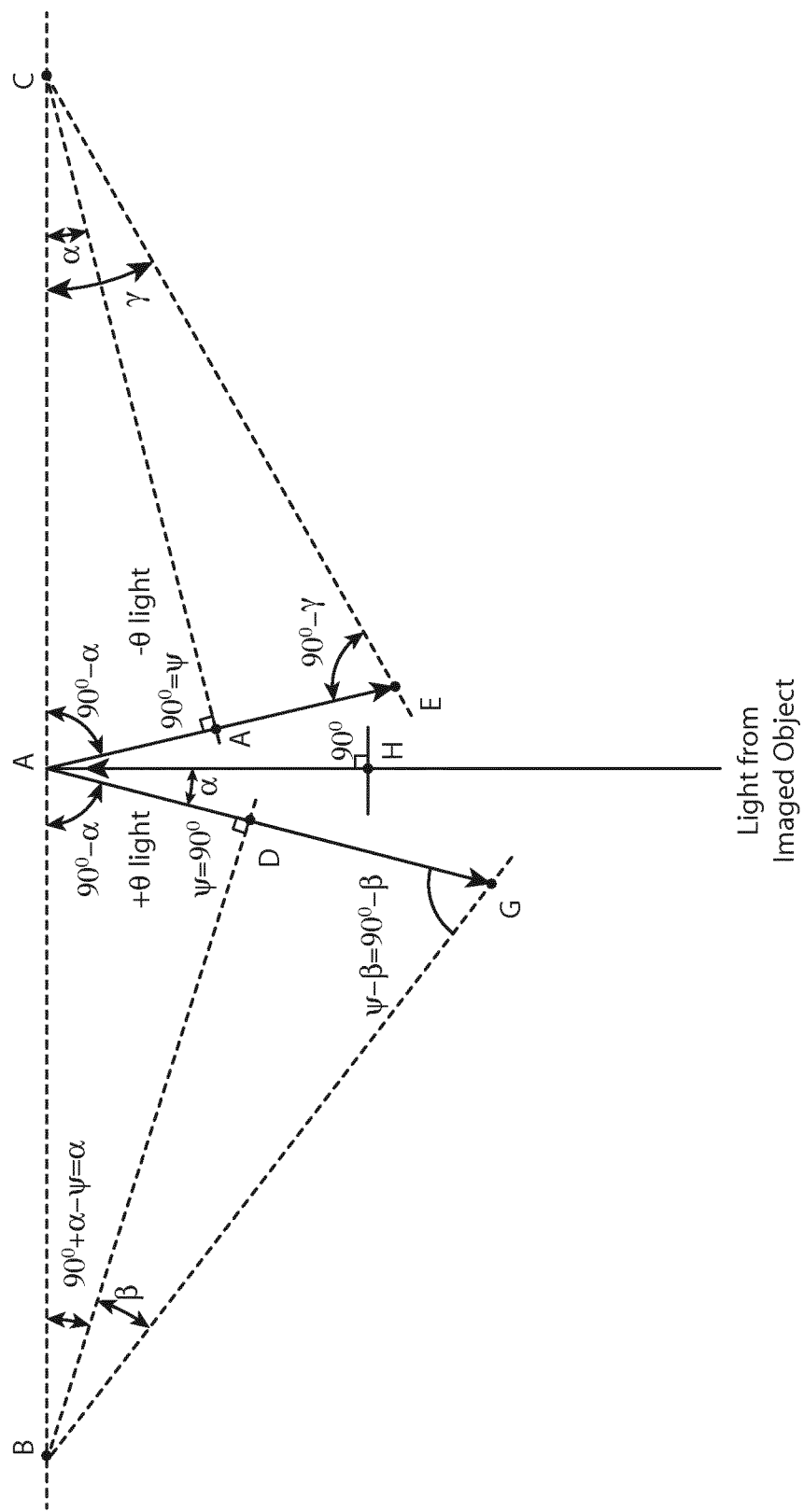
FIG. 2 discloses the optical layout design of this embodiment using the Scheimpflug principle.
Figure 3:
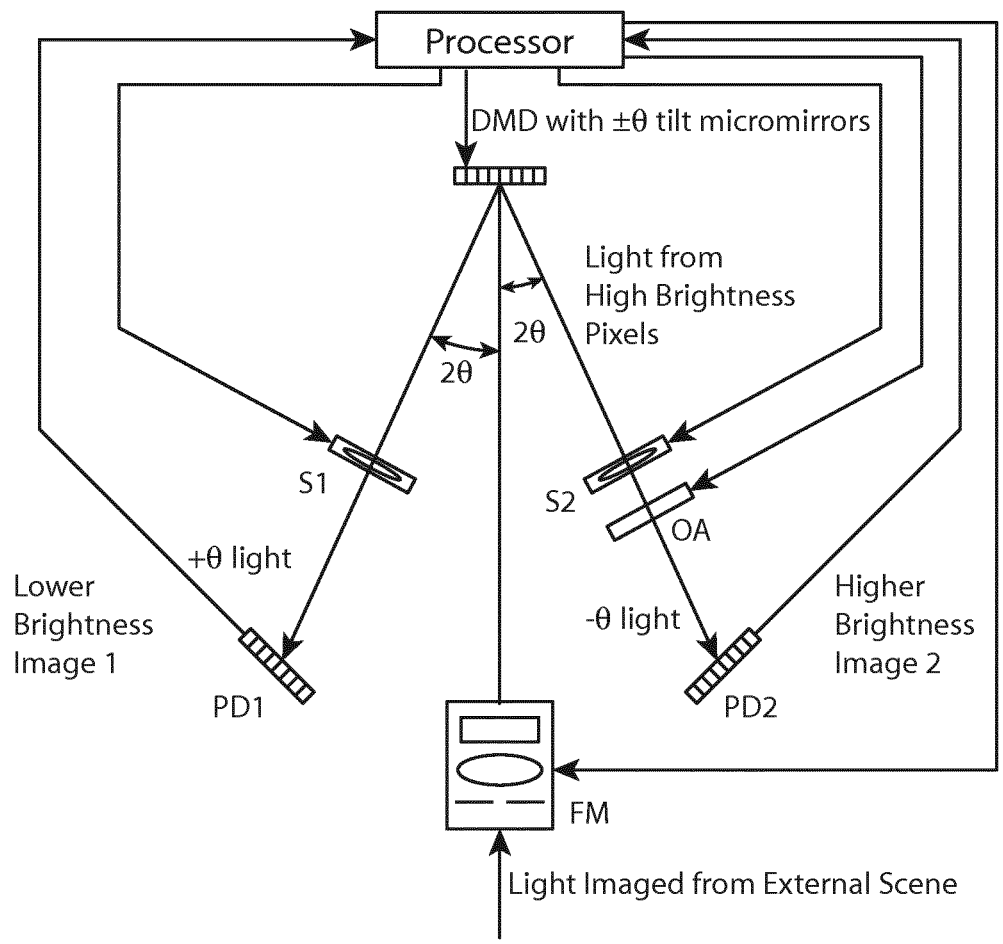
FIG. 3 discloses another embodiment of the imaging system of the present invention.

FIG. 2 shows the proposed smart photonic imager system optical layout design using the Scheinmpflug principle for high focus optical imaging. This design achieves in-focus images on the PD detector planes GB and FC line segments. The DMD is placed at location "A" and AH line segment representing the incident light optical axis is normal to the DMD plane. The incident light imaging lens system (FM is FIG. 1) is placed at location "H" and AH line segment representing the incident light optical axis is normal to the imaging lens system (e.g., FM in FIG. 1) plane. The central optical axis reflected light from the DMD at a given micromirror either travels along the AG line segment direction or the AF line segment direction. Appropriate lens systems are placed at the "D" and "E" locations such that the optical system device plane for example is at $\psi=90$ degree to the central line segments AG or AF. AD is the object distance and DG is the image distance that satisfies the imaging condition between A and G using the imaging lens system at D. "B" is found by drawing the AB and DB extended lines till they intersect at "B". Then "B" and "G" are connected by a line BG that defines the correct plane to place the 2-D image sensor (e.g., PD1 in FIG. 1). A similar approach for the −θ degree state light is used to find the line FC that defines the correct plane to place an imaging PD such as PD2 when light is imaged from the DMD plane to the PD plane. In FIG. 1, S2 functions as a light collection (or focus) lens and PD2 acting as a point detector should be placed on the central axis AF of the system and the distances AG and AF are not necessarily equal. In FIG. 3, S2 functions as an imaging lens and PD2 acting as a PDA that should be placed along the CF line direction centered at "F". Note the following angles on FIG. 2: $\alpha=2\theta$ where $\alpha$ is angle between AH and AG and $\theta$ is the binary tilt state angle of the DMD micromirror. Note that $\beta$ is the angle between BD and BG. $\psi-\beta=90-\beta$ is the angle between GB and GA and also is the angle the PD1 (e.g., in FIG. 1) makes with the central axis AG for the +θ state light. Note that $\alpha=2\theta$ where $\alpha$ is angle between AH and AF and $\theta$ is the binary tilt state angle of the DMD micromirror. Note that $\gamma$ is the angle between CE and CF. $90-\gamma$ is the angle between FA and FC and also is the angle the PD2 (e.g., in FIG. 3) makes with the central axis AF for the −θ state light. Here again for example, $\psi=90$ degree, the angle between AE and EC.

FIG. 3 shows an alternative embodiment of the smart photonic imager system design of the present invention. Both output ports use a 2-D PDA. One camera output port uses a 2-D PDA for lower brightness scene detection and while the other output port with an electronically controlled optical attenuator uses a 2-D PDA for higher brightness scene detection. The 2-D PDA may be a CCD/CMOS/FPA sensor or 2-D fiber-bundle terminated with a lenslet array and PDA. The +θ state light camera output port uses a 2-D PDA PD1 for lower brightness scene detection and while the other the −θ state output port with an electronically controlled Optical Attenuator (OA) uses a 2-D PDA PD2 for higher brightness scene detection. Here the OA helps optimize the full dynamic range usage of the PD2. Any type of optical amplification can be used for the lower brightness +θ state light such as using an image intensifier device before PD1 and/or fiber-optical amplification when using a fiber bundle. For both ports for optimal focus imaging, the Scheinmpflug principle is applied. Do note that the Scheimpflug principle is a prior-art geometrical optics rule that allows one to geometrically calculate the direction of the focus plane of an imaging optical system when the imaging lens plane is not parallel to the object plane (e.g., DMD in this case) or image sensor plane (e.g., PD1 plane). To start FIG. 3 system operations, the DMD can be operated in a full −θ state light setting so all scene light is sent to PD2 to record with OA control a sequence of higher brightness images. These images are then processed by the imager processor to determine the location of the higher brightness pixels in the scene image so next the DMD can be programmed to direct the lower brightness pixels to PD1. At this stage, the images simultaneously provided by PD1 and PD2 are again processed by the image processor to optimize the locations of the high brightness and lower brightness image pixels so the DMD micromirrors can be optimally controlled to produce the best possible high brightness and lower brightness images by PD2 and PD1, respectively. Next these PD1 and PD2 best quality image are processed by the image processor to stitch together one high quality scene image that shows both the high brightness zones as well as the lower brightness zones. All the electronically controlled smart optic devices work together with the image processor to form an adaptive optoelectronic system. The speed of response of the camera system will depend on the response time of the smart optic devices as well as the scene imaging lighting scenario including scene motion characteristics. It is understood that prior art advanced computer vision and image processing techniques can be deployed within the proposed smart camera unit systems to bring software power to the system using the proposed novel optical camera designs to enable scene imaging under extreme light conditions across broadband wavelengths. In FIG. 3, S1, S2, and FM imaging modules have ECVFLs to allow scene image magnification/demagnification controls so one can zoom into scene zones or look are wider scene views. It is also understood that the DMD can be used in time modulation mode (as suggested in prior arts) to control scene pixel level light exposure times on the photo-detection devices, in our case, PD1 and PD2 devices. Although the camera system designs shown use incoherent light, coherent light (e.g., from lasers) imaging is also possible using the proposed systems. In this case, the frontend FM imaging lens optics may not be needed in the systems.

Figure 4:
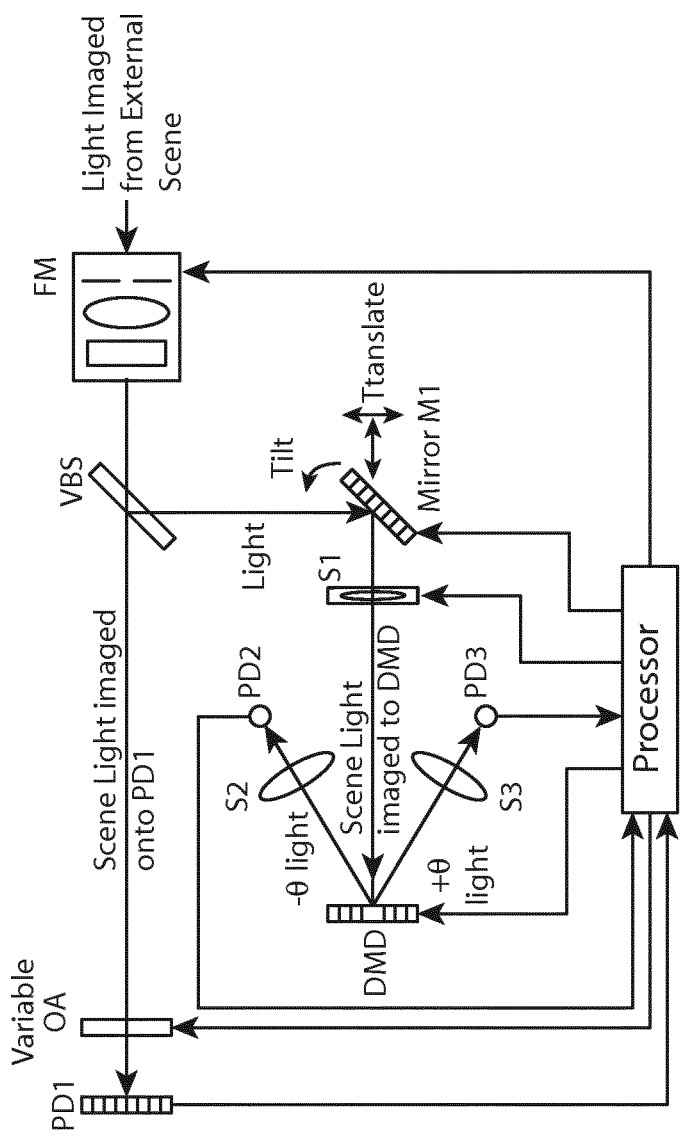
FIG. 4 discloses yet another embodiment of the imaging system of the present invention.

FIG. 4 shows yet another embodiment of the photonic imager system design of the present invention. A Variable Beam Splitter (VBS) splits the input scene light into two parallel channels. One channel (with an optional variable OA: optical attenuator) uses a 2-D PDA PD1 for lower brightness image scene detection. The other channel uses a two PD DMD-based imager for higher brightness scene detection where the PDs are PD2 and PD3. The proposed VBS embodiment can be a novel two TIR prism based splitter shown in FIG. 4 with the light split ratio controlled by changing fluid type (its refractive index) in the inter-TIR gap. An air gap provides 100% scene light directed to the DMD imager that uses two PDs. The FIG. 4 system provides simultaneous scene imaging by both camera units (i.e., the PDA camera as well as the DMD serial scan camera). In addition, this DMD camera is robust to temporally light fluctuations during scene serial scan image acquisition as PD2 and PD3 optical irradiance levels are normalized by their total irradiance level reading for each DMD agile pixel scan.

Figure 5:
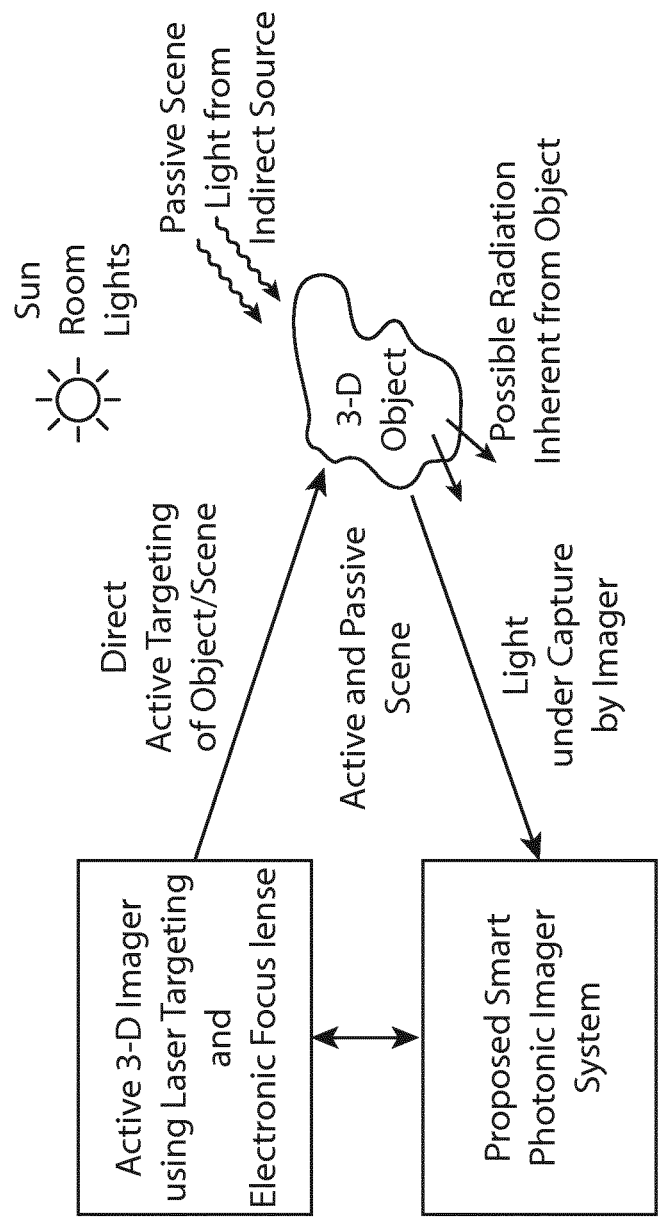
FIG. 5 discloses a block diagram of the imaging system of the present invention used in conjunction with a 3D imager.

FIG. 5 shows the novel application of the smart photonic system imager for 3-D object capture. This proposed dual system arrangement combines the prior-art active laser targeting 3-D imaging system with the proposed smart photonic imager system to produce a novel 3-D image capture system that is suited for high brightness scenes produced by the laser (active lighting) and lower brightness scenes produced by passive lighting conditions such as from the Sun, room lighting, and indirect laser radiation. The proposed camera systems are ideally suited for these 3-D imaging scenarios where both bright lasers as well as lower brightness light sources illuminate the target scenes of interest. Hence proposed is this novel arrangement of FIG. 5 where both active and passive imaging technology is combined in a unique way using the FIG. 1 to FIG. 4 proposed novel camera designs that usher in the age of smart photonic systems for extreme lighting conditions imaging using the N. A. Riza previously proposed original concept of agile pixel imaging using a 2-D SLM and PD.

The FIG. 1 to FIG. 5 imagers described in this application operate in the classic photo-detection mode where the light irradiance to be imaged is captured by a starring (i.e., Continuous Wave light photo-charge collection) mode PD (point or multi-pixel) that generates a DC current (or voltage) level per image frame in time that is proportional to the light irradiance (power) level at its specific spatial location on the SLM pixel map. When using a point PD, the SLM (e.g., DMD) in FIGS. 1 to 5 are programmed to pick the locations of the incident irradiance map that are sampled one location at a time so DC currents (or voltages) for given locations can be stored in time sequence in the computer for later irradiance map image reconstruction. If a multi-pixel PD (like a CCD) is used, then pixels of the SLM (e.g., DMD) have a unique fixed mapping with the CCD pixels to determine the instantaneous irradiance map image. In both cases, the PDs generate the irradiance map via a DC electrical signal representing the light generated electrical charge.

It is well known that in electronics such as PD devices and their signal processing electronics, 1/f (i.e., inverse of f) noise is a dominant noise effect for electrical signals. Here f denotes the electrical frequency in Hertz. With a lower value of f for the signal of interest in the electronics, the higher is the 1/f noise is the system. For the PD mode of operation mentioned so far in this application, f=0 or a DC current, giving a 1/f noise that is highest for the photo-detected signal. It would be highly desirable to operate the imager with much lower 1/f noise to produce a higher signal-to-noise ratio image of the incident irradiance map. To enable this goal, proposed is a new mode of operation of the imager where the DMD or the equivalent SLM is programmed as a pixel-location dependent temporal frequency coded incident irradiance light modulator with the optical image reconstruction done via photo-detection at the Intermediate Frequency (IF) band and electrical spectrum processing of the IF band signal, including IF band amplification and filtering, leading to low electronic noise optical imaging.

Figure 6:
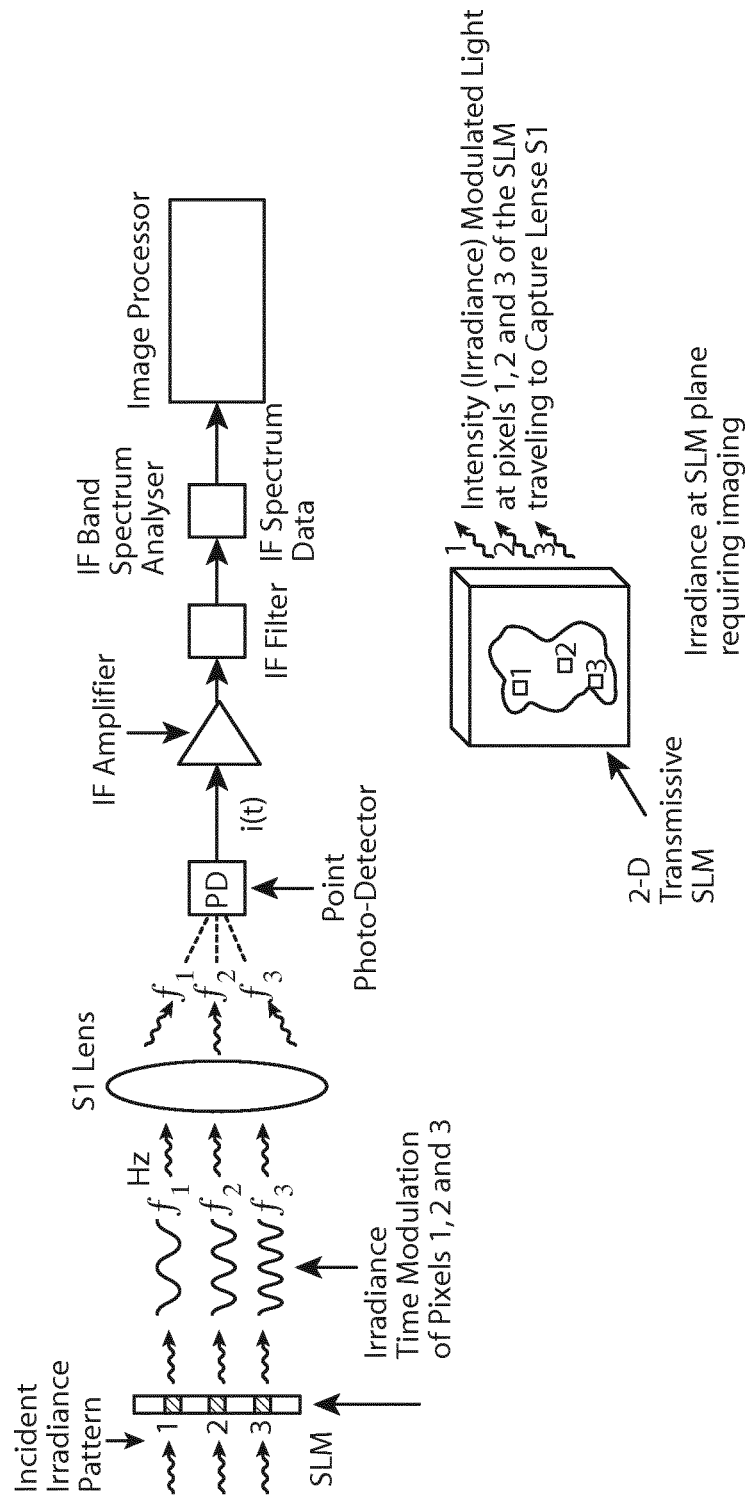
FIG. 6 discloses yet another embodiment of the imaging system of the present invention.

FIG. 6 shows the basic proposed smart photonic imager system concept where the imager is operating in an improved signal-to-noise ratio IF band photo-detection mode by having the irradiance modulating SLM device programmed to act as a spatial position-dependent temporal frequency coded incident irradiance light modulator. The SLM device could be replaced by a multi-pixel display device allowing secure image transfer and capture with the PD replaced by a guiding collection optic (e.g., optical fiber) terminated with the point PD.

Figure 7:
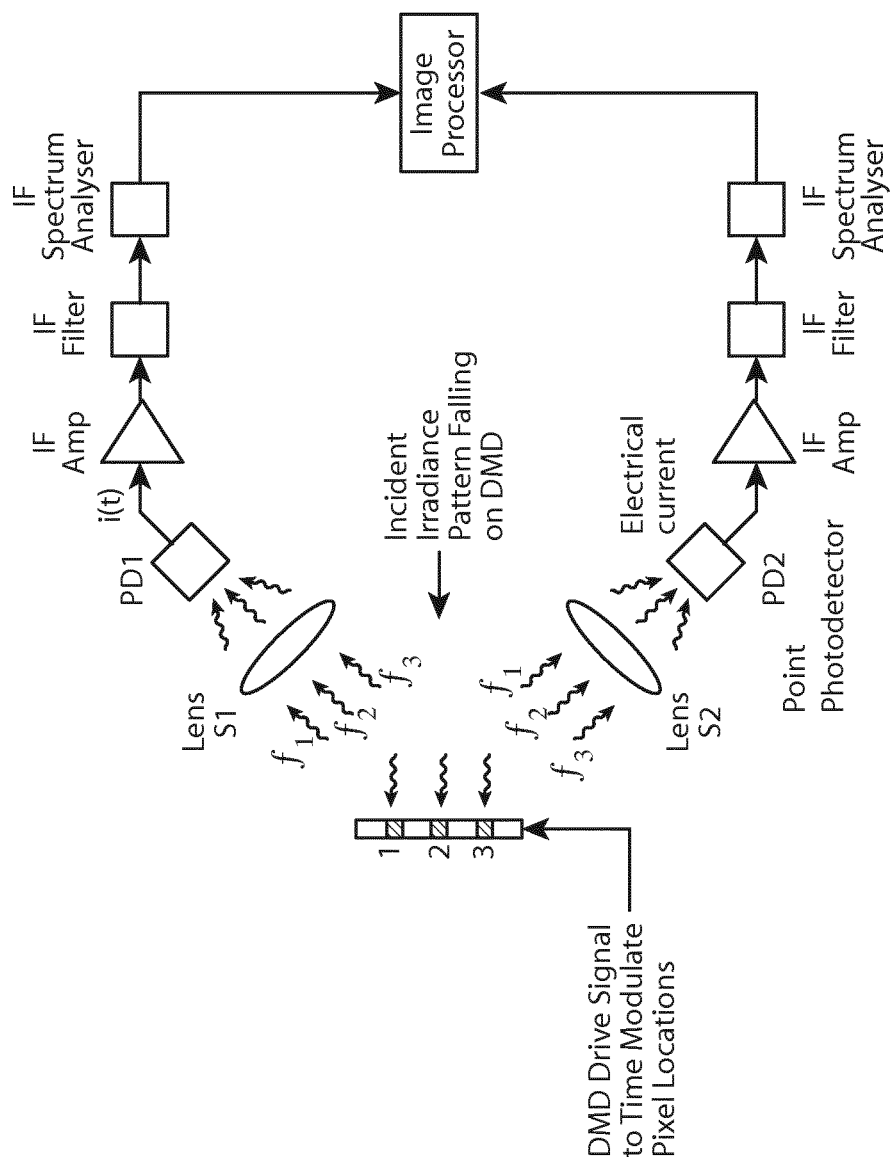
FIG. 7 disclose an embodiment of the imaging system of the present invention using the concept of FIG. 6.

Here the photo-detected signal is undergoing electronic spectrum analysis (such as via the Fast Fourier Transform (FFT) algorithm), e.g., within dedicated electronics and signal processing software to produce the decoding from a specific IF value to a specific SLM pixel position where the incident light pattern had first interacted with the SLM. As an example, the SLM is shown operating with 3 pixels (can be any shape, location and sized zones on the SLM), each time modulating its specific pixel incident light irradiance at a different temporal frequency, so pixel 1 at f1 Hz, pixel 2 at f2 Hz, and pixel 3 at f3 Hz. The remaining pixels in the SLM operate in the classic starring mode and are NOT time modulated. A transmissive SLM is shown in FIG. 6, although a reflective SLM such as a DMD can also be used as shown in FIG. 7. After the incident light pattern (the irradiance to be imaged) enters the SLM, N pixels of the SLM (N=3 in FIG. 6) are time modulated in irradiance with all the light after the SLM collected by a collection lens S1 so that all light falls on a point PD. For example, the SLM is operated such that only the 3 chosen pixels on the SLM let light through with time modulation of the irradiance at these pixel locations while the other pixels completely block the light. This is the case where the SLM pixels act as digital on/off time modulators. Note that analog irradiance time modulation of the SLM can also be deployed. The PD chosen has an operational electrical bandwidth exceeding the highest temporal modulation frequency of the SLM pixel, so is greater than f3 if f3 is the highest frequency in f3, f2, f1 Hz. The electrical current produced by the PD will have a DC current term (because intensity modulation of pixels requires light modulation around a bias irradiance level); plus the current contains electrical signals at the f1, f2, f3 Hz frequencies.

When the incident light irradiance on the SLM is considered an incoherent incident irradiance (e.g., from a white light source such as from the Sun or light bulbs), then the individual pixel temporally modulating irradiances contributions naturally add up in the PD photo-detection process without optical interference effects, thus leading to a linear addition of the 3 different temporal frequency electrical current signals, much like a simple Fourier series like sum producing independent spectral lines in the IF domain. These N=3 currents are proportional to the light irradiance levels at the 3 pixel locations on the SLM. This current after IF band electronic amplification and IF band filtering is fed to a FFT electronic implementer or IF band spectrum analyzer that produces the needed RF power spectrum of the total electrical current from the point PD. For example, the photo-detected current (or voltage) can be sampled by an Analog-to-Digital (ADC) converter and the digital bits are processed by the FFT algorithm software within a computer. By reading the RF power levels of the f1, f2, and f3 frequencies provided by the FFT spectrum, one can simultaneously measure and map the SLM plane incident light optical irradiance relative values at pixel 1, pixel 2, and pixel 3, respectively. Thus a novel imager design optical detection mode for the smart imagers is realized where the IF spectrum analysis of the PD provided electrical signal can simultaneously produce all the relative irradiance values for the time modulated pixel locations in the incident irradiance map leading to low noise detection of an image. Note that the imager can be calibrated to provide true irradiance maps versus relative irradiance values.

The choice of the time modulating pixel location, sizes, shapes, temporal frequencies, modulation type (digital, analog, mixed analog-digital) and numbers (e.g., look at 3 pixels simultaneously or 1 million pixels or 1 pixel at a time) depends on the application for the smart imager. With irradiance modulation of the pixel on the SLM in analog or gray-scale mode such as by using an analog liquid crystal SLM gives sinusoidal temporal intensity modulation while using the digital micromirrors on-off mode of the DMD gives on/off square wave like temporal modulations for the incident irradiance on the SLM. Note that prior-art optical systems have deployed a time modulating shutter on an entire light beam to produce a photo-detected signal on an IF to extract weak signals such as during material characterization (see for example A. Nag, A. K. De, and D. Goswami, "Two-photon cross-section measurements using an optical chopper: z-scan and two-photon fluorescence schemes," *J. Phys. B At. Mol. Opt. Phys.*, vol. 42, no. 6, p. 065103, 2009). The innovation in FIG. 6 shows how one can code irradiance image space with temporal frequencies to realize a novel optical imager design where IF spectrum analysis of photo-detected electrical signal provides the near instantaneous spatial irradiance mapping of the optical image (light pattern) incident of a time modulating multi-pixel zone SLM. This powerful new idea in smart imaging on the photo-detection side of imager design can produce new capabilities for optical imagers over many fields of science and engineering. Choice of temporal frequencies f1, f2, . . . , fN can also be optimized to reduce non-linear processing effects including intermodulation products and pixel overlapping harmonics. In addition, electronic amplification and filtering can be used to reject known frequency noise signals to produce the desired frequency spectrum power data to provide the sampled image space irradiance map. For example, any stray light reaching the PDs in the FIG. 6 and FIG. 7 imagers will not have undergone IF modulation via the DMD/SLM device, and will therefore show up as a DC signal in the PD electrical output. This can be easily filtered out to produce a lower noise output signal from the desired irradiance map that is IF modulated on the DMD/SLM plane. Furthermore, coherent electrical detection methods after photodetection (for example homodyne and heterodyne detection) instead of stand-alone IF amplification, can be used to pick up and electrically and coherently amplify imaged irradiance levels that would otherwise be deeply buried in system noise. One such suitable method is lock-in amplification. In this case, the SLM pixel time modulation drive signals are generated via the SLM image generation electronics that can provide mutually coherent pixel drive signals as they are generated from the same system clock in the SLM drive electronics. Thus, this coherent clock (i.e. the fundamental carrier) that electrically drives the SLM pixels can be used as the phase synchronizing and carrier mixing signal input for a lock-in mode amplifier that is also fed by the signal produced by the point PD in the imager. It is also possible to use a combination of lock-in amplification and standalone amplification on a SLM pixel basis. In other words, certain pixels (such as for example low irradiance level signals buried in optical noise) in the irradiance map being imaged may require coherent phase-sensitive lock-in amplifier-based detection, while other pixels (such as for example those pixels with a high brightness level) are adequately resolved using non-phase sensitive standard IF amplification without using a phase-locking carrier signal from the SLM pixel driver electronics. Note that with phase sensitive dual channel lock-in detection, a complex domain (in-phase and quadrature) EFT IF spectrum analysis can be conducted for the photo-detected signal from the point PDs, leading to phase sensitive optical imaging capabilities.

If the light irradiance incident on the SLM is coherent (e.g., from a laser source), simultaneous detection of multiple pixel light on the same zone of the PD can generate optical field-based interference effects. These interference effects can be nulled to produce true linear summation of the irradiance contributions to the photo-detected current. Fundamentally, coherent light from different pixels of the SLM produce an interference fringe pattern on the PD. By choosing a point PD active area that is large enough that it spatially integrates light over many fringe cycles of the interference pattern, the interference term is averaged out to zero leaving only the linear sum of the irradiance values from the individual pixels, giving the desired output signal current containing the sum of the frequencies time modulating the different pixels. The pixel locations at any instant can be picked to produce fast enough spatial frequencies on the PD active area to produce adequate averaging of many fringe cycles. Another method to counter interference effects is to place a random optical phase screen (like a diffuser) after the SLM that puts a random optical phase to the optical fields at the different time modulating pixel locations. By doing so, the interference term nulls out during the PD photo-detection process.

An important outcome of the proposed smart imager design of FIG. 6 is that the physical size of the pixel chosen for time modulation can be extremely small and does not fundamentally have to obey the traditional imaging system Abbe diffraction limit for transverse dimension best resolution possible for the detection optical image. So one can envision the SLM to have extremely small (much less than optical wavelength) pixel zones that can undergo optical irradiance time modulation allowing an image of the irradiance pattern interacting with the SLM to be created that breaks the classic Abbe resolution limit. This is because the spatial irradiance information of the SLM incident image that is mapped onto a position coded temporal frequency map and then resolved by the temporal frequency spectrum analysis is no longer connected to fundamental Abbe spatial diffraction limits of an optical imaging system. In this case, the FFT spectrum analysis system must resolve two independent pixel modulating frequencies closest to one another and these can be chosen far enough away that they can be resolved by the FFT spectrum analysis deployed in the imager. A number of SLM device technologies could realize the desired pixel-level time modulator such as Silicon NEMS (Nano-Electro-Mechanical Systems), Quantum Dot and quantum well devices, Nano-membrane devices, nano-polymer-based liquid crystal modulators, nano-liquid devices, and other nano-material based SLMs including bio-molecular material (e.g., fluorescent proteins and organic small-molecule fluorophores) based SLMs. In effect, optical imagers with spatial resolutions beating the Abbe diffraction limit can be achievable using the proposed FIG. 6 smart imager concept keeping in mind incident irradiance map interactional constraints due to geometry and SLM type.

FIG. 7 shows an implementation of the FIG. 6 system concept using the DMD as the SLM. Two arms of the detection system are formed, each with their point PDs, IF amplifiers, IF filters and IF band FFT implementators. Data from both detection arms is used to reconstruction a robust optical irradiance map using the two detected RF spectra of the two independent photo-detected currents. Such a system always displays built-in redundancy and fault-tolerance given two photo-detected signals are detected although a single PD arm can produce the desired image map. The principle of FIG. 6 also works for the other proposed FIG. 1 to FIG. 5 imager systems. When multi-pixel PDs are used with independent PD pixel currents, these different electrical current/voltage outputs should be summed before undergoing spectrum analysis.

The FIG. 6 embodiment shows the irradiance pattern to be imaged as an incident light pattern striking the SLM device. Proposed next is an alternate embodiment to the FIG. 6 design where the SLM device is replaced by an optical image generation device such as an optical display device with multiple pixels where each pixel can be electronically (or optically) controlled to produce pixel-based irradiance modulation in time. Again, each pixel is allocated a specific temporal modulation frequency and irradiance modulation format so multiple pixels undergoing simultaneous irradiance modulation in time can be identified in pixel spatial location using the earlier described IF spectrum processing. Regardless of the size of the pixel on the display device and the aperture of the light collection optic (S1), the Abbe diffraction limit of the classic optical system no longer prevents full recovery and image reconstruction of the pixel resolved irradiance map originally displayed on the display device. For example, nano-LED array, nano-laser array, a quantum dot modulator array, or any other display device where the emission pixel size is under the classic optics resolvable pixel size, will still be spatially resolved on a super-pixel basis using the proposed IF spectrum processing. So although optically viewing the super-small pixel display image using classic imaging optics (e.g., lens/mirror optics) will not allow one to optically see (or resolve) the image on the display on a pixel basis, the proposed invention has the unique power to allow full recovery of the pixel-based irradiance map using the novel IF spectrum processing method that is fundamentally devoid of inter-pixel spatial crosstalk noise, in particular, when the image resolution in violating the Abbe limit. This unique power of the proposed FIG. 6 design is because light from the time modulating pixels in the display device, although overlapping spatially and unresolvable in space on the light collection optic face (e.g., PD aperture), is still captured for information processing and hence the true display image data is not lost and can be used for image recovery.

The FIG. 6 PD can also be replaced by an appropriate light capture optic (e.g., an optical waveguide like an optical fiber) so the captured light emitting from the display device is transported to another physical location before being converted via the PD to an IF spectrum signal, thus forming an optical communications data link where the data is the image on the display that is undergoing pixel-based IF coded irradiance modulation. The design of the light capture optic (e.g., lens S1 in FIG. 6 and an optical fiber instead of the PD in FIG. 6) with respect to the display device determines any windowing of the captured irradiance from the different pixels in the display. Because both the capture optics and display device are spatially fixed in the pixel/aperture sizes and locations, the effect of the windowing can be calibrated into the IF signal processing to recover the true un-windowed irradiance pattern on the display. Depending on the display device technology, the IF band can occupy a variety of spectral bands in the RF spectrum from Hertz to many GHz and even higher. The optical communications data link proposed also becomes an extremely secure data link as first a user codes the image pixels with temporal frequencies and their given modulation formats, then the user at the receiver end must know the true frequency codes and modulation formats to correctly decode the PD generated IF data to recover the true image. Thus the FIG. 6 system not only forms an optical imager, it also forms a display capture systems that can function as a secure optical communication data link.

A special scenario of the FIG. 6 design is when the aperture of the display device matches the aperture of the light collection optic so a face-to-face coupling of the display chip can be implemented with the capture optic like with the core of the optical fiber. In this case, the FIG. 6 lens S1 is not used, thus implementing lensless image transfer, and light from all the pixels from display chip goes straight into the fiber which delivers it to the PD attached to the other end of the fiber. So a super-compact image transmission guide is formed using a single fiber and single PD with single miniature display device, e.g., nano-LED array.

Another special scenario of the FIG. 6 design is when an object under observation is placed directly on the SLM chip cover glass, or adjacent to the display device (i.e., SLM location in FIG. 6). For example, a biological specimen slide can be placed almost in contact with the display or SLM chip that is acting as an IF-coded point light sources in a multi-pixel grid under the sample slide that is being imaged, or perhaps as a thin film containing the sample to be imaged, e.g., via a sample in a fluidic channel on the SLM. In the compact lensless (i.e. without lens S1) configuration of the FIG. 6 imager, the point PD sits atop the sample slide to collect light from all pixels from the SLM grid, providing the IF coded pixel location specific point light sources. In one embodiment, a plurality of stacked thin fluidic surface layers are placed atop the SLM chip. In this case, only one fluidic layer channel at one time contains the sample to be imaged, with the other fluidic layers filled with a refractive index matching fluid, so that the light passing through the stacked layers of fluids essentially does not see the other fluidic surface channel boundaries. To image another sample in a different fluidic channel layer, this channel must be fed with the sample while all the other channels interacting with the light should contain the index matching fluid. Also note that defocus algorithms in imaging processing can be used if needed to improve focus restoration for the near-field acquired images via this shadow-type lensless imaging system (i.e., when not using lens S1 in FIG. 6), when sample layers are not directly in the close near field of the SLM pixel plane. It is important to note that adjacent pixels in the SLM can be time modulated in time sequence to reduce adjacent pixel crosstalk picked up from the sample under view. This is unlike prior-art lensless imaging methods that use a multi-pixel PD chip (e.g., a CCD or a CMOS sensor chip), where all imaged pixels from the sample fall simultaneously on the multi-pixel PD causing in-separable inter-pixel crosstalk, due to the light propagation effects between the sample and the PD plane.

If a thick (i.e., having multi-axial planes using the Rayleigh axial resolution criteria) object/sample is under imaging study, the axial plane subjected to imaging in the 3-D object can be selected using various confocal microscopy techniques. Because the display or SLM pixels can be smaller than the Abbe limit of the optical capture system, imaging that beats the Abbe transverse resolution can still be achieved. Again, time modulation of the display or SLM device (needs the use of a light source next to the SLM chip) is used with IF spectrum processing to recover the image plane under observation, thus implementing nanoscopy (breaking the Abbe limit) on the transverse pixel plane.

Another special scenario of the FIG. 6 design is the display device can emit light of different wavelengths. In one mode, a pixel of the display device can be a wavelength tunable light source either inherently or by using a wavelength tuning filter at the pixel. In another mode, pixels in the display can be designed to be simultaneously emitting pixel specific wavelengths. Either way, electronic control of emitted wavelength at a display pixel provides another mechanism for image irradiance reconstruction (of object plane physically adjacent to display) on a many simultaneous pixel detection basis level as pixel locations are wavelength coded in addition to being IF coded as each display pixel operates as an emitted light irradiance modulator in time. One can also imagine the display plane first imaged on to an object plane under observation and then the object plane wavelength and IF coded irradiance map being collected by the collection lens so this multi-wavelength light falls on the point PD. In this case, since classic imaging lens optics is being used between the display plane and the object plane, one cannot break the Abbe diffraction limit. Note that because the pixels in the display are not coherently synchronised such as when using an LED array or a laser array with independent laser cavities per pixel, the multi-wavelength light detected by the point PD does not suffer fundamentally from optical interference effects. If the display simultaneously uses multiple wavelengths or multiple wavelength bands at the same time, one can deploy dispersive optics (gratings, dichroic beam splitters, prisms, fiber gratings, photonic crystal devices, etc) to separate the colors before photo-detection so independent point PDs can be used, say for red, green, and blue color bands allowing multi-spectral imaging for the visible band. Tuning of the display wavelength in time can also be used to provide multi-color imaging, in this case, simply by using the same point PD for all colors, but one color at a time. In summary, it is not required that the display device in FIG. 6 imager design emit the exact same wavelength for each pixel in the device and use of different wavelength-coded pixels along with the IF coding of display pixels can produce powerful signal processing capabilities and features for image recovery of object plane under view. Again, prior-art confocal microscopy methods can be engaged to deliver 3-D imaging capabilities.

It should also be noted that not all pixels in the SLM or display device in the FIG. 6 imager need to operate in an irradiance time modulation mode to produce IF coded pixels for photo-detection. Based on initial image intelligence gathered from object viewing using a non-time modulated optical imager such as a CCD or CMOS imager or the prior-art DMD SLM plus point-detector based imager, a new hybrid design imager that is pixel efficient can be realized by combining the proposed FIG. 6 imager using IF pixel coding for chosen pixels with the DC current photo-detection-based prior-art imagers. For example, like FIG. 4 design, one can use a Variable Beam Splitter to create two independent imaging channels, one for the classic DC current-based imager and one for the proposed imager with pixel coding using specific IF values. In effect, a smart imager system is realized using a combination or hybrid imager design suited for extreme conditions optical imaging, a theme of the proposed invention of a smart agile pixel within the sampling SLM/display device irradiance plane.

It should also be noted that in front of each photo-detector (PD) (point or 2-D array) in the proposed smart imager designs, one can place a Polarizing Beam Splitter (PBS) to separate the vertical and horizontal linear components of the light polarizations coming from the optical irradiance map subjected to imaging by the optical system. In this case, a pair of PDs is used after the PBS to detect each orthogonal linear polarization separately. By doing so, the proposed imager can extract polarization information of the imaged optical irradiance.

In summary, the FIG. 6 design and its embodiments enable optical imaging that can defy the classic Abbe limit; in addition, the innovation also provides a mechanism for very low noise highly sensitive image extraction via the IF (radio frequency) signal processing platform with advanced applications leading to secure data transmission and image capture. Here the mature radio frequency (RF) and microelectronics industry and their chip innovations are fully exploited to extract the super-resolution optical irradiance data maps that would otherwise be unseen using classic diffraction limited optics.

Figure 8:
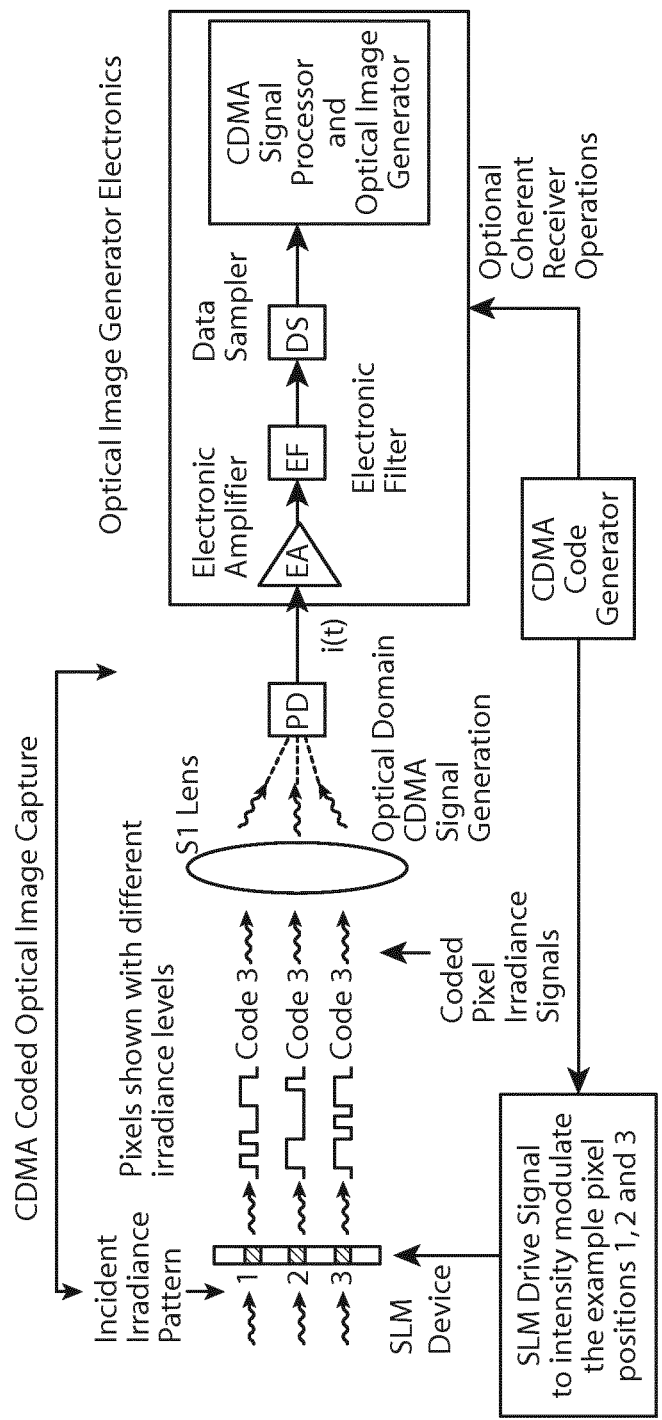
FIG. 8 discloses yet another embodiment of the imaging system of the present invention which uses the principles of CDMA communications.

FIG. 8 shows an alternate generalized operation of the Smart Photonic Imaging System camera unit using image optical irradiance pixel position coding of the SLM based modulation using spread spectrum time-frequency codes, also called Code Division Multiple Access (CDMA). Unlike the frequency coded (also called FDMA: Frequency Division Multiple Access) SLM/display modulation described in earlier imager embodiment where each pixel carrying optical irradiance data has its assigned frequency value in Hertz over the modulation time duration, the proposed CDMA pixel coding method gives each pixel a spread spectrum in the electrical frequency domain. This means that no specific frequency assignment is required for any SLM/display device sampled irradiance pixel, and additional pixels can be added for image processing without careful assignment of non-overlapping frequencies per pixel to enable unambiguous pixel irradiance decoding by the RF spectrum analysis signal processing operation. For the Coded Access Optical Sensor (CAOS) Imager Technology or CAOS imager, decoding of pixel position based irradiances values is implemented using high time-bandwidth product processing gain multi-channel time domain correlation operation between received multi-pixel CDMA signal and the individual pixel CDMA codes.

FIG. 8 shows the optical design and operations of the CAOS imager of the invention. Incident optical irradiance to be imaged strikes the 2-D transmissive pixelated SLM (a reflective SLM can also be deployed using a different optical systems geometry). Each pixel in the SLM is used to time modulate the pixel incident optical irradiance using a binary code sequence that acts as a irradiance data spreading signal that has a spread spectrum in the electrical frequency domain. Such coding of pixels in the SLM follows the CDMA data encoding approach commonly used in wireless cellular mobile communications. N pixels in the SLM are simultaneously time modulated by CDMA codes with optimally all codes mutually orthogonal (like Walsh codes) to each other so decoding of pixel irradiances is possible with maximum autocorrelation values and minimum cross-correlation values. FIG. 8 as an example shows N=3 pixel irradiances being simultaneously time modulated by 3 different CDMA binary sequence codes. These N=3 light signals are collected via lens S1 and fall on a point photodetector PD that generates a CDMA baseband spread spectrum electrical signal i(t) that is the sum of the 3 pixel irradiance amplitude modulated signals where each pixel was time modulated by its unique binary sequence CDMA code. The individual bit time of the M-bits code depends on the time modulation response of the SLM device technology with bit bandwidths ranging from sub-Hz to even 100 GHz or more. The length M of the code also depends on the CAOS imager application and the number N of pixels the imager desires to detect simultaneously in time using the CDMA technique. To improve pixel irradiance decoding signal-to-noise (SNR) for a given N, increasing M improves signal processing gain via the time integrated correlation operation. This is the same reason why very weak RF signals buried in noise and picked up by mobile cell phone can be detected by a high sensitivity CDMA receiver in a modern phone. This same principle is deployed in the pixel irradiance decoder of the CAOS imager.

The photo-detected signal i(t) in FIG. 8 passes through an Electronic Amplifier (EA) and Electronic Filter (EF) to enhance the SNR of the multi-pixel CDMA signal i(t) before it enters the Data Sampler (DS). For example, for a baseband multi-pixel CDMA signal (i.e., a signal not on an RF carrier in order to produce a signal on an IF), the DS can be an Analog-to-Digital Converter (ADC). With the multi-pixel CDMA signal digitized, powerful correlation signal processing functions can be implemented using parallel array architectures (see FIG. 10) in software, dedicated microelectronic hardware, or hybrid software-hardwired electronics to implement high speed CDMA signal decoding to recover the pixel irradiances sampled by the SLM device. Coherent or phase-locked decoding operations can also be implemented to produce high SNR and correlation processing gains using the same CDMA code signals to feed the SLM driver electronics as well as the decoding electronics. It is very important to note that the CAOS imager can defy the Abbe transverse resolution of the diffraction limited lens S1 and SLM-based optical system. For example, the lens S1 may have a transverse optical resolution that is unable to resolve the pixel size of the SLM, yet the CAOS imager via CDMA pixel encoding and decoding can fully resolve the SLM pixel-based irradiance values illuminating the pixelated SLM. Such power for the CAOS imager derives from the fact that pixel-to-pixel irradiance separation is NOT done in the spatial optical processing domain where optical diffraction fundamentally limits optical system imaging resolution. Instead, the CAOS imager resolves the pixel-to-pixel based irradiance in the electrical time-frequency signal processing domain that does NOT suffer from inherent optical spatial diffraction limits such as the Abbe transverse resolution limit. This in turn also means that if the SLM pixel size is smaller than the Abbe diffraction limit of the optical system and in fact is much smaller than the wavelength of the optical irradiance, the CAOS imager can still resolve this extremely small pixel size on the SLM using proposed CDMA signal processing using the appropriate CDMA codes. Furthermore, a lensless imager can be realized for the CAOS imager by eliminating the S1 lens between the SLM and PD. In this case, the PD is placed adjacent to the SLM so the entire PD active area overlaps the SLM.

Figure 9:
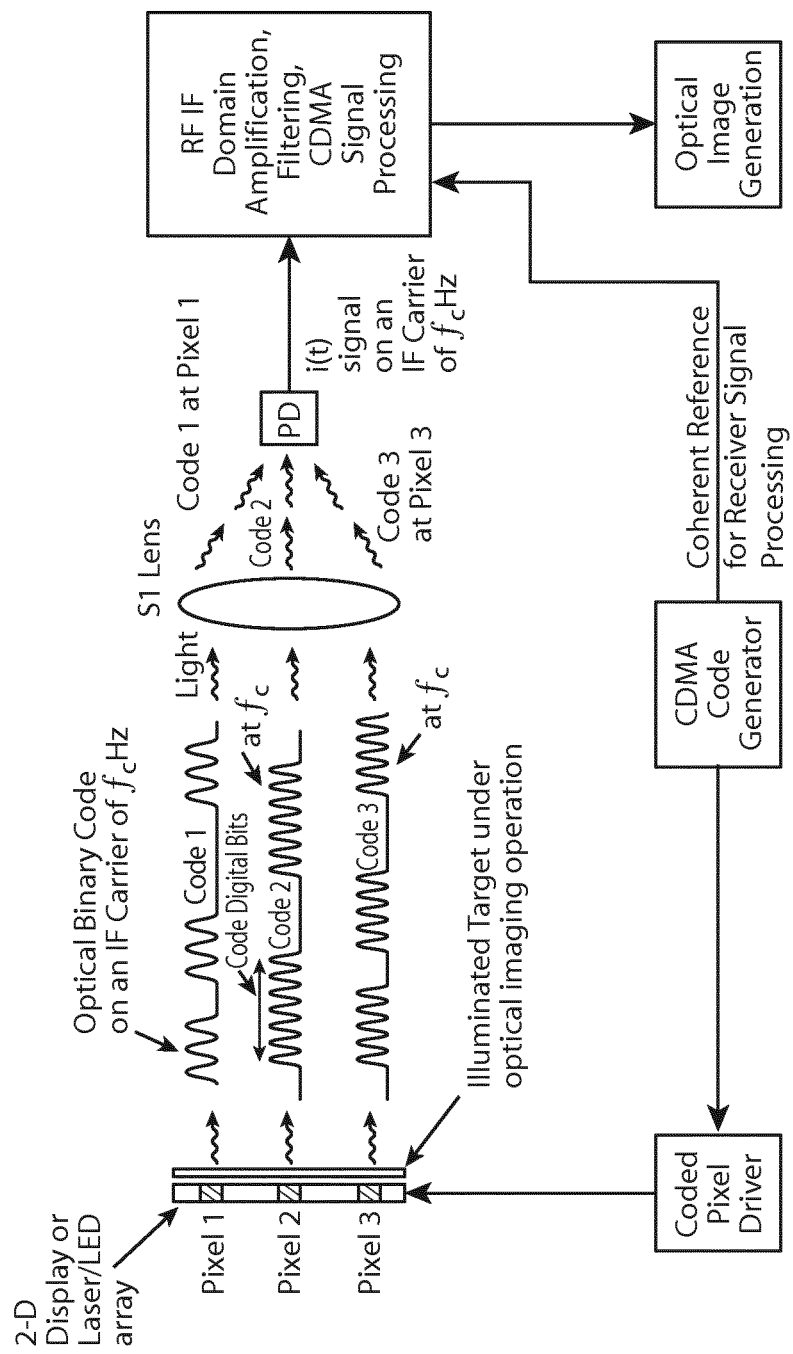
FIG. 9 discloses an alternative embodiment of the imaging system of the present invention using the concept of FIG. 8.

FIG. 9 shows an alternate design of the CAOS imager where the SLM is replaced by a 2-D pixelated display device or a 2-D light source array device such as a 2-D laser array or 2-D LED array. The object to be optically imaged is placed adjacent to the display/light source array device such as by placing a microscope slide on the SLM device. One can also imagine that the sample to be imaged is directly placed on the cover glass of the display chip. Unlike the FIG. 8 CAOS imager, the FIG. 9 imager produces a multi-pixel CDMA signal on an IF (Intermediate Frequency) carrier of $f_c$ Hz. Specifically, within each bit code of the CDMA M-bit sequence, there is an IF carrier of $f_c$ Hz. FIG. 9 shows that all pixels modulated on the display use the same IF of $f_c$ Hz. The PD generated multi-pixel CDMA signal i(t) is on an IF of $f_c$ Hz, much like how a cell phone receives an RF CDMA signal on a communications band carrier of $f_c$ Hz where for example $f_c$=1.4 GHz. Thus, the FIG. 9 imager design can deploy mobile phone type IF-based pixel decoding processing. This IF-based signal processing is also similar to RF radar receiver correlation signal processing that can produce exceptional SNR and large processing gains to detect extremely weak irradiance signals (buried in deep noise) from the pixels of the imaged light map. Note that frequency hopping codes across an RF band to modulate the pixels can also be used and in this case the $f_c$ values are different for the different pixels, although, a mid-band $f_c$ Hz value is considered as the IF for signal processing hardware selection.

Figure 10:
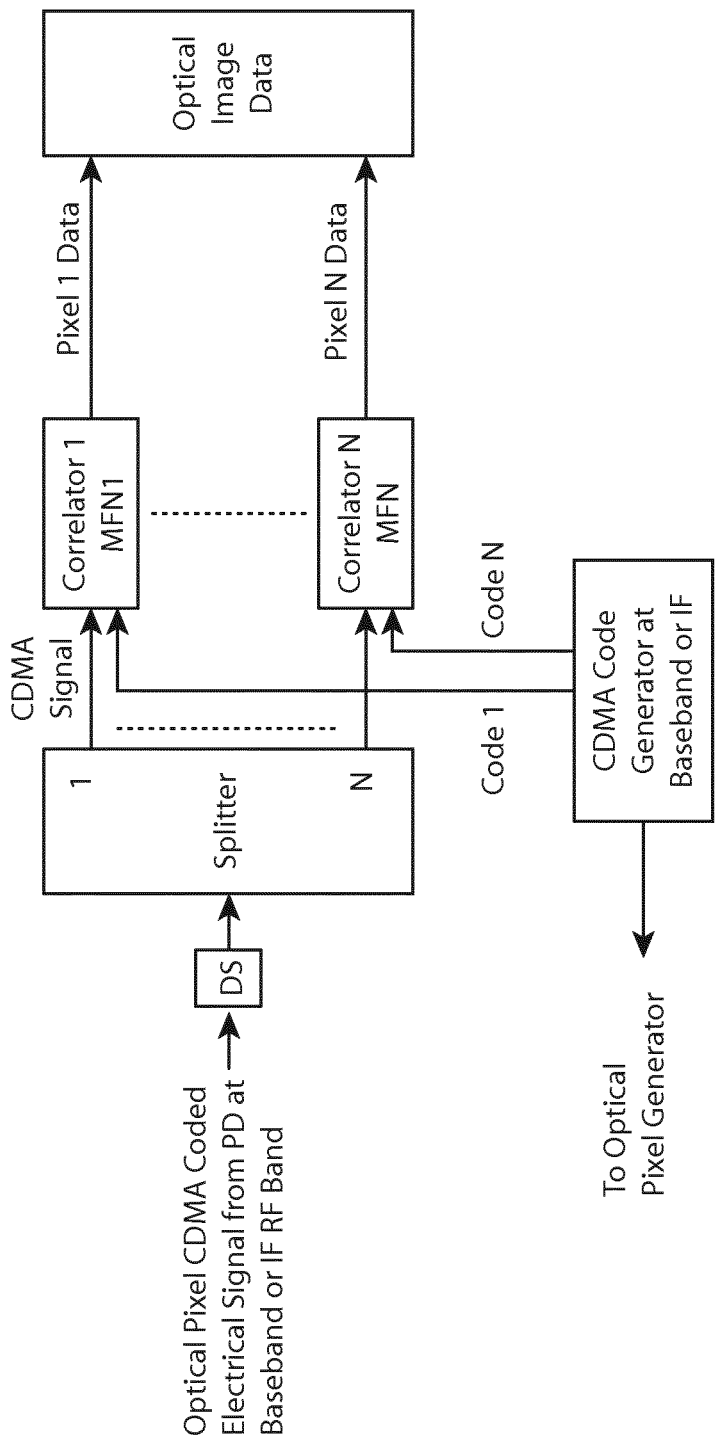
FIG. 10 shows the parallel processing signal correlation architecture to recover the CDMA sampled optical image for the embodiments of FIGS. 8 and 9.

FIG. 10 shows a proposed parallel processing signal correlation architecture implemented in software or dedicated electronic hardware to recover the CDMA sampled optical image. Here the correlation operations can be at baseband or IF based on whether the FIG. 8 or FIG. 9 designs are used. For the FIG. 8 design with the PD producing a digital baseband signal, the DS is a ADC. On the other hand, for the FIG. 9 design with the multi-pixel CDMA signal riding on an IF, the DS is an RF mixer connected to a local RF oscillator. After the DS, the sampled multi-pixel CDMA signal is split into N replicas corresponding to N pixels that were simultaneously time modulated at the SLM/display device. Each CDMA signal replica is fed to a time integrating correlator also fed with its pixel specific CDMA code. The N outputs of the correlators provide the N-pixel irradiance map that was originally sampled at the SLM/Display image plane where the light map was originally present. The correlators function as an array of matched filters, each with its own match filter function corresponding to its pixel specific CDMA code. Once the multi-pixel CDMA signal is digitized, all CDMA decoding signal processing can be implemented in software using powerful computing machines. In the case of the IF-based multi-pixel CDMA signal, dedicated custom RF microelectronics can be engaged to implement decoding and matched filtering signal processing. Furthermore, a hybrid processor can also be engaged that uses both dedicated RF electronics and digital computing machines to implement the pixel-based encoding and decoding operations for the CAOS imager. Note that In-Phase (I) and Quadrature (Q) signal processing in the FIG. 10 architecture is also possible using the additional Q-signaling chains in the overall signal processor. FIG. 10 for simplicity only shows the I-processing chain in the decoding operations. Also note that the pixel encoder and pixel decoder can be mutually phase-coherent using the same time-base to generate the CDMA codes for both SLM/display pixel encoding and multi-pixel CDMA signal decoding to recover the pixelated optical irradiance map incident at the SLM/display plane.

An important point to note regarding both the FIG. 8 and FIG. 9 CAOS imagers is that the multi-pixel CDMA signal produced by the PD are spread spectrum signals in the electrical frequency domain. This is completely unlike classic CCD and CMOS imagers that operate in starring mode collecting photo-charge that produces a DC current from the pixels and hence is subjected to excess 1/frequency or 1/f noise in the image generation electronics. For the CAOS imager, 1/f noise is reduced greatly, in particular, when an IF is used in the decoding process to recover pixel irradiance information from the multi-pixel CDMA signal produced by the PD.

Because optical SLM and display/emitter devices can produce/modulate linear polarized light of orthogonal polarizations, Polarization Division Multiple Access (PDMA) techniques can be used to double the pixel count for simultaneous CDMA operations in the CAOS imager using 2 independent signal processing channels, one for linear p-polarized light and one for linear s-polarized light with channels optically separated using a polarization beam splitter device.

Another finer point to note is that if one looks at a typical CDMA spread spectrum signal, it looks like a Chaotic signal in time, hence the natural link to the name CAOS imager as the proposed camera is based on SLM pixel coding using CDMA technology.

Both the CDMA and FDMA pixel coding smart imager designs allow multiple pixels in the irradiance map under observation to be processed simultaneously, saving significant time to produce a desired image. This is in contrast to the TDMA or Time Division Multiple Access imager where the irradiance map on the SLM (e.g., DMD) is scanned one pixel at a time, thus requiring larger time duration to complete the image map, although with minimal inter-pixel crosstalk as only one pixel irradiance data is detected by the PD at any instant.

Because of the electronic programmability of the SLM/display devices sampling the optical irradiance map under observation, the proposed smart imager can operate in a hybrid mode based on the application, and can be using a combination of CDMA, FDMA, PDMA, and TDMA modes of operations to match the needs of the imaging environment and its specific application.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for performing high dynamic range optical image detection of a scene comprising:
  imaging incident light from a scene into two parallel channels simultaneously using a variable beam splitter device onto an object plane of a 2D spatial light modulator (SLM) device and onto an object plane of a 2-D photo detector array, wherein the variable beam splitter device directs light in a first direction onto the object plane of the 2D SLM device and directs light in a second direction onto the object plane of the 2-D photo detector array;
  determining locations of pixels, in the object plane of the 2D SLM device, having a first brightness level;
  detecting, by two point photo detectors, optical irradiance values of the pixels, to produce a first detected image;
  detecting, by the 2-D photo detector array, optical irradiance values of pixels, in the object plane of the 2-D photo detector array, having a second brightness level to produce a second detected image, wherein the first brightness level is higher than the second brightness level; and
  generating a dynamic range optical irradiance map of the scene by combining the first detected image and the second detected image into a single image.

2. The method of claim 1, wherein the 2D SLM device comprises a digital micromirror device (DMD).

3. The method of claim 2, further comprising:
  setting the DMD to its −θ degree tilt state to direct sampled light from the object plane of the DMD for detection of the optical irradiance values of the pixels of the first brightness level by a first point photo detector; and
  setting the DMD to its +θ degree tilt state to direct sampled light from the object plane of the DMD for detection of the optical irradiance values of the pixels of the first brightness level by a second point photo detector.

4. The method of claim 2, wherein the imaging comprises imaging different on-axis focal planes in the scene to provide 3-D imaging, and wherein the method further comprises operating the DMD in its confocal pin-hole mode for 3-D imaging and programming the DMD with a pinhole in either the DMD −θ degree tilt state or the DMD +θ degree tilt state to acquire 3-D image data.

5. The method of claim 1, further comprising detecting the optical irradiance values of the pixels of the first brightness level and the pixels of the second brightness level simultaneously.

6. The method of claim 1, further comprising separating vertical and horizontal linear components of light polarizations prior to detecting the optical irradiance values of the pixels of the first brightness level.

7. The method of claim 6, further comprising providing a pair of point photo detectors to detect each of the vertical and horizontal linear components of the light polarizations separately.

8. The method of claim 1, further comprising operating the 2D SLM device in a time modulation mode.

9. The method of claim 8, wherein the 2D SLM device comprises a multi-pixel optical display device, and wherein the method further comprises:
  time modulating incident light irradiance of one or more of the pixels on the object plane of the 2D SLM device at a specific temporal frequency to detect time modulating signals,
  intermediate frequency (IF) band amplifying and filtering each detected time modulating signal; and
  performing a fast Fourier transform of the filtered signal so as to detect relative optical irradiance values for time modulated pixel locations in the object plane of the 2D SLM device so as to reconstruct the first detected image at the object plane of the 2D SLM device.

10. The method of claim 9, further comprising independently controlling the time modulation of the incident light irradiance for each of the one or more pixels, and wherein each pixel of the one or more pixels is time modulated at a different selected frequency.

11. The method of claim 9, further comprising optical wavelength coding each of the one or more pixels on the object plane of the 2D SLM device.

12. The method of claim 8, wherein the 2D SLM device comprises a multi-pixel optical spatial modulation device, and wherein the method further comprises simultaneously time modulating incident light irradiance of one or more of the pixels on the object plane of the 2D SLM device using a binary code sequence to give each of the one or more pixels a spread spectrum in an electrical frequency domain.

13. The method of claim 12, wherein the binary code sequence in time comprises a code division multiple access (CDMA) binary sequence code,
and wherein the method further comprises:
  amplifying and filtering a multi-pixel CDMA signal comprising a sum of the one or more time modulated pixels;
  data sampling the filtered multi-pixel CDMA signal; and
  performing CDMA signal processing on the data sampled multi-pixel CDMA signal,
  wherein the performing comprises:
    dividing the multi pixel CDMA signal into one or more replicas corresponding to the one or more time modulated pixels; and
    inputting each of the one or more replicas to a corresponding time integrating correlator provided with the CDMA binary sequence code associated with a time modulated pixel, wherein an output of the correlator corresponds to an optical irradiance value of the time modulated pixel.

14. The method of claim 1, further comprising:
comparing an optical irradiance value of each pixel in the object plane of the 2D SLM device to a predetermined threshold irradiance value; and
determining that the pixel is of the first brightness level if its optical irradiance value is higher than the predetermined threshold irradiance value,
wherein the pixels of the second brightness level correspond to the pixels in the object plane of the 2D SLM device which are determined to have an optical irradiance value equal to or lower than the predetermined threshold irradiance value.

15. An apparatus for performing high dynamic range optical image detection of a scene comprising:
  means for imaging incident light from a scene into two parallel channels simultaneously using a variable beam splitter device onto an object plane of a 2D spatial light modulator (SLM) device and onto an object plane of a 2-D photo detector array, wherein the variable beam splitter device directs light in a first direction onto the object plane of the 2D SLM device and directs light in a second direction onto the object plane of the 2-D photo detector array;
  means for determining locations of pixels, in the object plane of the 2D SLM device, having a first brightness level;
  means for detecting optical irradiance values of the pixels to produce a first detected image;
  means for detecting optical irradiance values of pixels, in the object plane of the 2-D photo detector array, having a second brightness level to produce a second detected image wherein the first brightness level is higher than the second brightness level; and
  means for generating a dynamic range optical irradiance map of the scene by combining the first detected image and the second detected image into a single image.

* * * * *